United States Patent [19]

Iwasaki

[11] Patent Number: 5,515,132
[45] Date of Patent: May 7, 1996

[54] PHOTOMETRIC CONTROL DEVICE FOR CAMERA

[75] Inventor: Hiroyuki Iwasaki, Kawasaki, Japan

[73] Assignee: Nikon Corporation, Tokyo, Japan

[21] Appl. No.: 242,053

[22] Filed: May 13, 1994

Related U.S. Application Data

[63] Continuation of Ser. No. 118,610, Sep. 10, 1993, abandoned.

[30] Foreign Application Priority Data

Sep. 16, 1992 [JP] Japan .................................. 4-246755

[51] Int. Cl.⁶ ............................................. G03B 7/08
[52] U.S. Cl. ......................... 354/432; 356/215; 356/222
[58] Field of Search ................................. 354/432, 402; 356/215, 222; 250/214 P; 348/297, 298, 910, 226, 362–365

[56] References Cited

U.S. PATENT DOCUMENTS

| | | | |
|---|---|---|---|
| 4,774,588 | 9/1988 | Noda et al. | 348/910 X |
| 4,791,446 | 12/1988 | Ishida et al. | 354/432 X |
| 4,843,417 | 6/1989 | Ishida et al. | 354/432 X |
| 4,929,824 | 5/1990 | Miyazaki | 354/432 X |
| 4,989,093 | 1/1991 | Kaneko | 348/226 |
| 5,053,871 | 10/1991 | Ogawa et al. | 348/226 |
| 5,272,539 | 12/1993 | Kondo | 348/226 |
| 5,293,238 | 3/1994 | Naxano et al. | 348/226 |

FOREIGN PATENT DOCUMENTS

| | | |
|---|---|---|
| 61-185733 | 9/1986 | Japan . |
| 62-259022 | 11/1987 | Japan . |
| 1-217428 | 8/1989 | Japan . |

*Primary Examiner*—W. B. Perkey
*Attorney, Agent, or Firm*—Oliff & Berridge

[57] ABSTRACT

A photometric control device for a camera comprises a light-receiving device 7 for conducting a photometry on a subject field with an accumulation type of photoelectric conversion device to output a photometric signal corresponding to brightness of the subject field, an accumulation time setting unit 13 for controlling an accumulation time of the photoelectric conversion device, a selection unit 14 for selecting any one of a first brightness value calculation mode for suppressing affection of flicker of a light source and a second brightness value calculation mode for taking no consideration of the affection of flicker on the basis of the accumulation time determined in the accumulation time setting unit 13, and a brightness value calculation unit 10 for calculating a brightness value on the basis of the photometric signal from the light-receiving device 7.

56 Claims, 9 Drawing Sheets

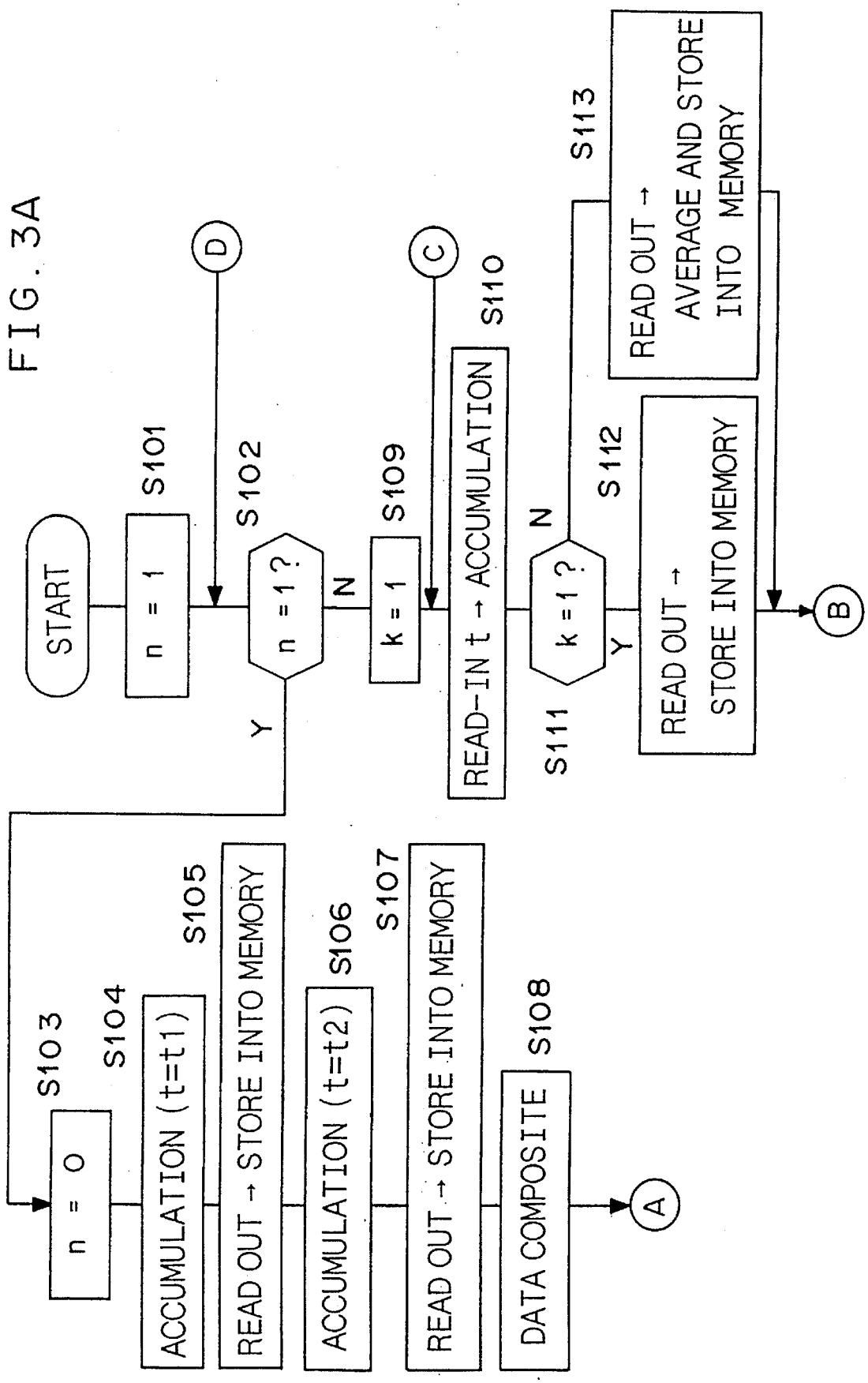

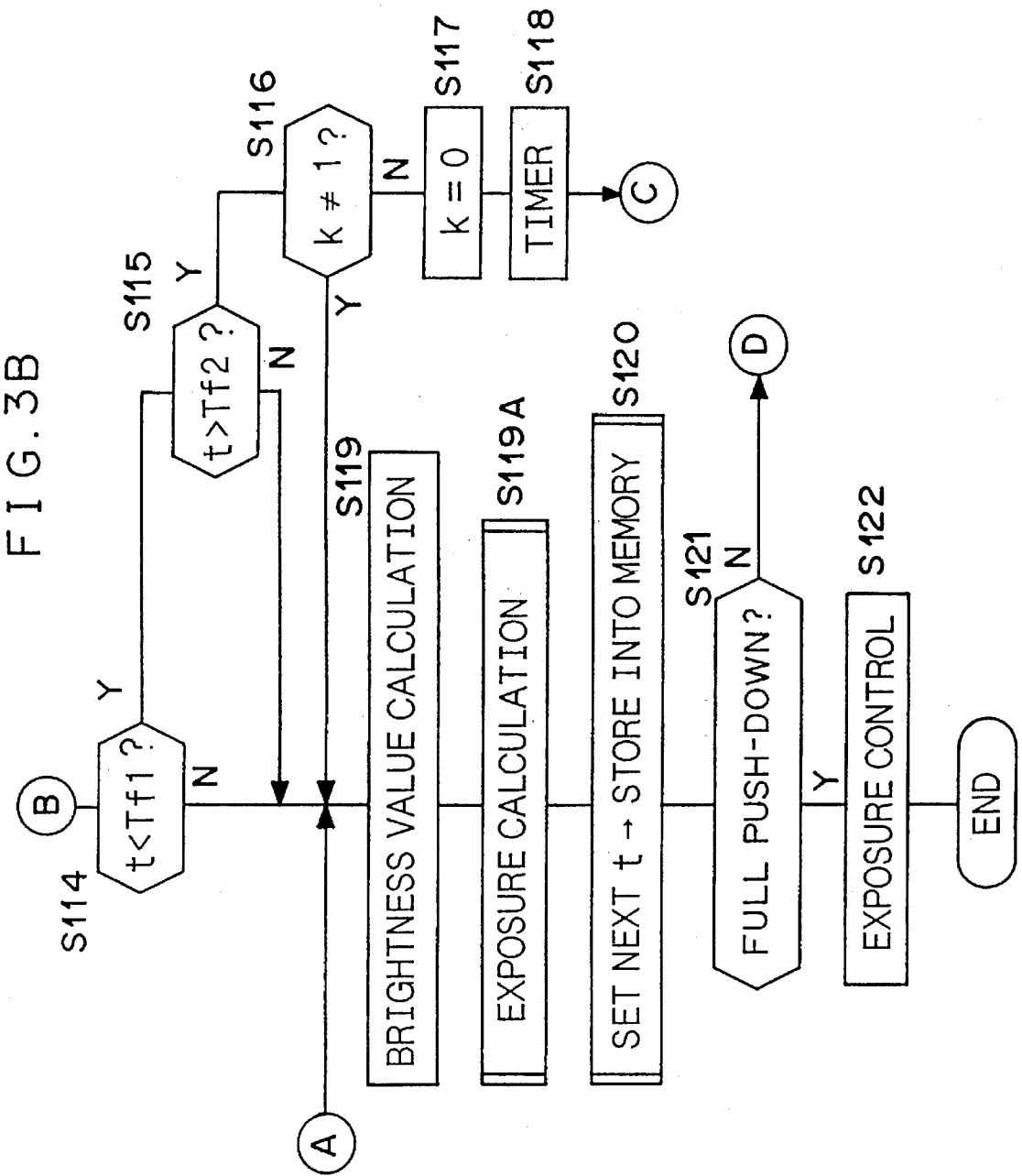

PHOTOMETRIC CONTROL DEVICE FOR CAMERA

This is a continuation of application Ser. No. 08/118,610, filed Sep. 10, 1993, now abandoned.

BACKGROUND OF THE INVENTION

1. Field of the Invention

This invention relates to a photometric control device for a camera in which a photometry is conducted on a subject field which is divided into plural photometric regions, thereby calculating an exposure value on the basis of information on the brightness of each photometric region.

2. Description of Related Art

There has been conventionally known a camera for performing photometry on a subject field to be photographed which is divided into plural photometric regions to calculate an exposure value on the basis of information on brightness of each photometric region. For example, a camera as disclosed in Japanese Laid-open Patent Application No. 1-217428 adopts a so-called "divisional photometry" in which a photographic field (corresponding to a subject field) is sectioned in a matrix form into plural photometric regions, and the photometric region is independently subjected to a photometry to detect information on the brightness of each photometric region, that is, a photometric signal (photometric output value) corresponding to each photometric region and obtain a proper exposure value.

As a photometric control device for the divisional photometry it has been known to use an electric charge accumulation-type of photoelectric conversion device, such as a Charge Coupled Device (CCD) as disclosed in Japanese Laid-open Patent Application No. 62-259022, for example.

This photometric control device using the above kind of accumulation-type of photoelectric conversion device has the following disadvantage when it is used to carry out a photometry under a fluorescent lamp.

Under an artificial illumination such as a fluorescent lamp, illumination light is periodically fluctuated as shown in FIG. 7 due to affection of the frequency of a power source, that is, a flicker phenomenon occurs. The flicker period Tf is about 10 ms in a region where a 50 Hz power source is used, and about 8.3 ms in a region where a 60 Hz power source is used. In a case where a photometry is carried out under illumination having such a flicker phenomenon, the photometric output would be fluctuated in accordance with a phase of the flicker period at which the electric charge accumulation is conducted if the electric charge accumulation time t of is shorter than the flicker period Tf, so that no accurate brightness may be obtainable.

Therefore, in the photometric control device as disclosed in Japanese Laid-open Patent application No. 62-259022, the electric charge accumulation operation is carried out plural times, and the respective results of electric charge accumulation operation are averaged to calculate the brightness value, whereby the affection of the flicker is minimized.

The flicker greatly affects the photometric result in the case where the electric charge accumulation time is within a predetermined range, and in other cases, an accurate brightness value can be obtained in with no consideration of the affection of the flicker. However, in the photometric control device as disclosed in the above publication, the average value of the electric charge accumulation time is calculated to obtain the brightness value at all times irrespective of the length of the electric charge accumulation time. Therefore, an unnecessary operation must be carried out even when no affection of the flicker is imposed, and thus the brightness value can not be rapidly obtained.

SUMMARY OF THE INVENTION

An object of this invention is to provide a photometric control device for a camera in which in a photographing operation under illumination light having a periodical flicker such as fluorescent light, a calculated brightness value is prevented from containing an error due to the flicker.

In order to attain the above object, a photometric control device for a camera according to this invention comprises photometric means for performing a photometry on a subject field divided into plural sections using a charge-accumulation type of photoelectric conversion device to output a photometric signal corresponding to brightness of the subject field; accumulation time control means for controlling an accumulation time of the photoelectric conversion device; selection means for selecting any one of a first brightness value calculation mode for suppressing affection of flicker and a second brightness value calculation mode for taking no consideration of affection of flicker on the basis of the accumulation time determined by the accumulation time control means; and brightness value calculation means for calculating a brightness value in accordance with the selected brightness value calculation mode on the basis of the photometric signal from the photometric means.

In the first brightness value calculation mode, the brightness value is calculated on the basis of photometric signals obtained in plural photometries whose timings are deviated from one another to suppress errors due to flicker.

The brightness value calculation means preferably comprises first read-out means, second read-out means and calculation means as described later. When the first brightness value calculation mode is selected, the photometric means is actuated for a set accumulation time from a first time, and the first read-out means reads out a photometric signal output from the photometric means thus actuated. Subsequently, the photometric means is actuated again for a set accumulation time from a second time at which a delay time set to prevent affection of a flicker period elapses from the first time, and the second read-out means reads out a photometric signal output from the photometric means thus actuated. The calculation means calculates the brightness value on the basis of the photometric signals read out by the first and second read-out means.

According to the photometric control device of this invention, in a photometry under illumination light with flicker having predetermined periodicity such as fluorescent light, only for an accumulation time (period) which is affected by flicker, the brightness value is calculated with an average value of plural photometric signals obtained at two times of photometry, for example, high-level and low-level photometric signals at one flicker period, so that the calculated brightness value can be prevented from containing an error due to flicker.

BRIEF DESCRIPTION OF THE DRAWINGS

FIGS. 3A and 3B are flowcharts for a main algorithm;

DETAILED DESCRIPTION OF THE PREFERRED EMBODIMENTS

An embodiment according to this invention will be described with reference to FIGS. 1 to 6.

<Optical System>

Figure 1:
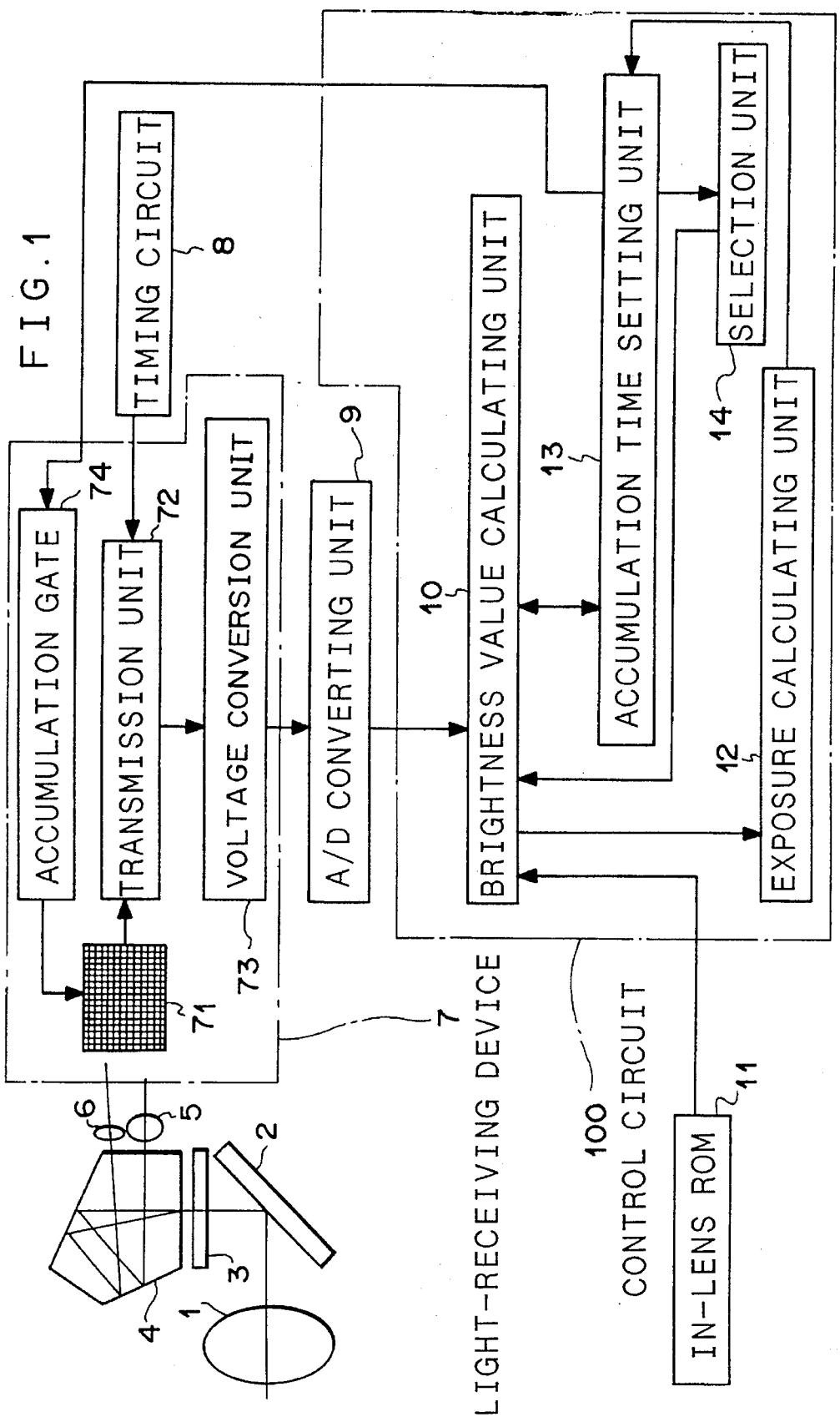
FIG. 1 is a block diagram showing an embodiment of a photometric control device according to this invention.

FIG. 1 shows the construction of an optical system of a camera. Reference numeral i represents a photographing lens, and light of a subject in a photography (hereinafter referred to as "subject light") which has been passed through the photographing lens 1 is directed through a quick return mirror 2, a diffusion screen 3, a pentagonal prism 4 to an eyepiece 5 so as to be seen by a photographer. On the other hand, a part of the subject light which is diffused by the diffusion screen 3 is directed through the pentagonal prism 4 and a lens 6 to a photometric light-receiving device 7.

<Photometric Light-receiving Device and Control System>

Figure 2:
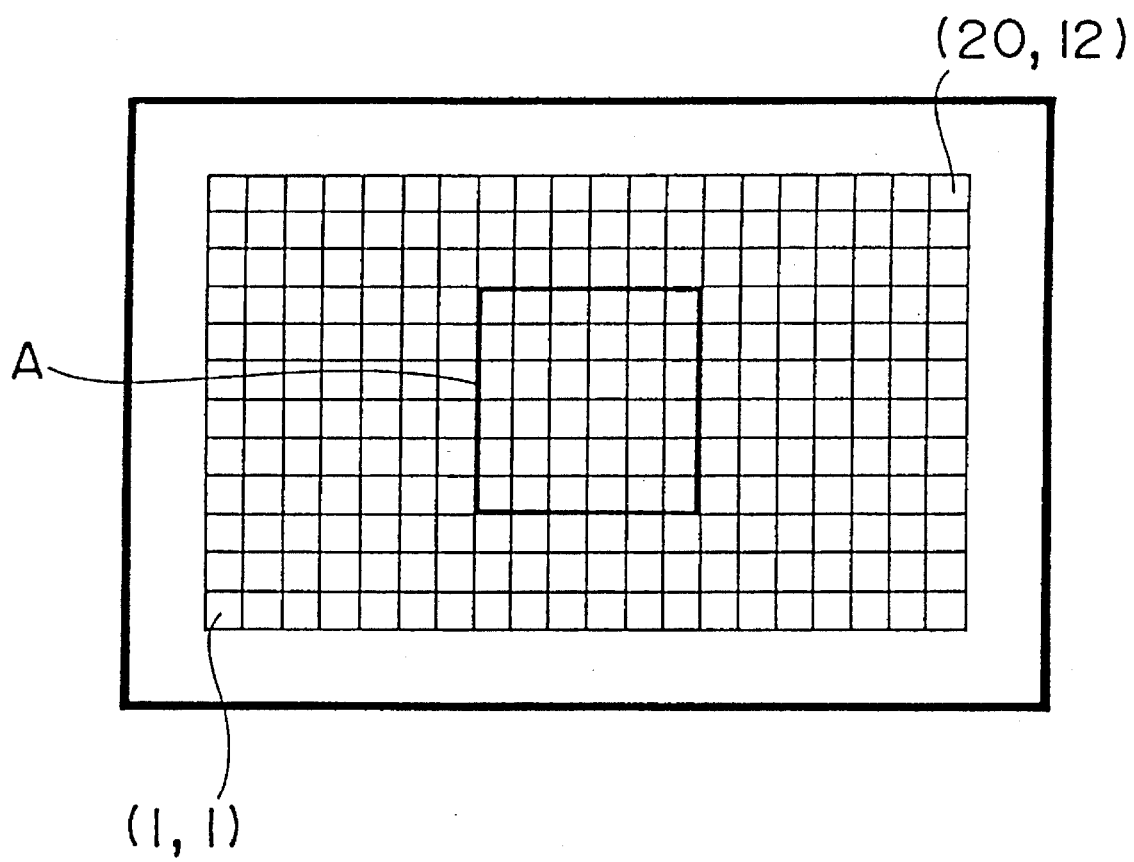
FIG. 2 is a diagram showing a dividing pattern of a light-receiving element.

The photoelectric device 7 comprises an electric charge accumulation-type of photoelectric conversion device such as a CCD sensor, and it includes a light-receiving and accumulating unit 71, a transfer unit 72, a current-to-voltage converter 73, and an accumulation gate 74. As shown in FIG. 2, the light-receiving and accumulating unit 71 comprises totally 240 photoelectric segments (20 segments in a horizontal direction and 12 segments in a vertical direction) which are arranged in a matrix form so as to enable a photometry for a subject field, and charges which are induced in each segment upon light irradiation thereto are accumulated in each segment.

A timing circuit 8 serves to produce a clock pulse required for electric charge transfer in response to a master clock which is input from a clock generating circuit (not shown), and inputs the clock pulse to the transfer unit 72. In accordance with the input clock pulse, the transfer unit 72 picks up the electric charges accumulated in every segment (picture element) of the light-receiving and accumulating unit 71 and transfer the pickup charges to the current-to-voltage converter 73 in synchronism with each clock pulse. The current-to-voltage converter 73 serves to convert 240 charge signals input thereto into respective voltage values, and outputs them from an output terminal to an A/D (analog-to-digital) converter 9 as a photometric signal. The A/D converter 9 converts the photometric signal (voltage signal) from the current-to-voltage converter 73 into a digital numeral signal (photometric output value) in order that a digital photometric operation in a control circuit 100 can be conducted, and outputs the converted digital signal. The accumulation gate 74 receives a pulse signal from an accumulation-time setting unit 13 in the control circuit 100, and instructs the light-receiving and accumulating unit 71 to start and terminate the electric charge accumulation.

The control circuit 100 actually comprises a microcomputer. The microcomputer functionally comprises the accumulation-time setting unit 13 as described above, a selection unit 14, a brightness calculating unit 10, and an exposure calculating unit 12. The accumulation-time setting unit 13 serves to calculate an optimum accumulation time for a next charge accumulating operation on the basis of information from brightness value calculating unit 10 and the exposure calculating unit 12, thereby adjusting an accumulated charge amount. The selection unit 14 serves to select execution or non-execution of a countermeasure for suppressing affection of flicker on the basis of the calculated accumulation time.

The brightness value calculating unit 10 serves to calculate a brightness value in accordance with lens information from an in-lens ROM 11, the accumulation time input from the accumulation-time setting unit 13, the photometric signal of the A/D converter 9, and the selection result of the selection unit 14. The exposure calculating unit 12 receives a brightness signal from the brightness value calculating unit 10 to perform an exposure calculation for calculating a proper exposure value and to determine an aperture and a shutter speed based on the proper exposure value.

Upon push-down of a release button (not shown), the mirror 2 is leapt up, and a diaphram and a shutter are controlled to have calculated aperture and shutter speed to perform an exposure control operation.

<Necessity of Accumulation Time Setting>

The necessity of adjustment of an accumulation time of the light-receiving device 7 by the accumulation-time setting unit 13 will be described.

A range of EV0 to EV20, that is, about 20 EV in dynamic range is generally required as a photometric range for the photometric control device of the camera, however, a currently-used CCD sensor has a dynamic range about 10 EV at maximum. Therefore, it is necessary to set the required photometric range to the optimum level containing a photometric value of a main subject by adjusting the accumulation time of the CCD sensor.

Specifically, when the brightness value in a subject field ranges from EV0 to EV20, illuminance on the light-receiving surface of the light-receiving device using a standard photographing lens is within a range of about 0.01 Lx to 1,0000 Lx. The light-receiving device has the photosensitivity of about 20 V/lx·s and saturation output of about 2 V, and thus the photometric range is about EV10 to EV20 for the accumulation time of 10 μs, and about EV0 to EV10 for the accumulation time of 10 ms. That is, by adjusting the accumulation time of the light-receiving device in the range of 10 μs to 10 ms, the photometric range required for the photometric control device of the camera, that is, the dynamic range of EV0 to EV20 can be attained.

Incidentally, when the photometry is carried out using a CCD sensor, for the reason as described above, the photometric range in one photometry is limited to a range of 10 EV, however, no disadvantage in photography occurs because the dynamic range of a sliver halide film is smaller than 10 EV.

<Main Algorithm>

FIGS. 3A and 3B are a flowchart for a main algorithm of the control circuit 100.

When the release button is pushed down halfway (hereinafter referred to as "half push-down operation"), the program as shown in FIGS. 3A and 3B is executed in the control circuit 100. At a step S101 a flag n is set to an initial value "1". This flag n is used as an identifier for judging whether there is a brightness value usable for a photometry which is about to be carried out. "n=1" indicates absence of a calculated brightness value, and "n=0" indicates presence of a calculated brightness value.

If n=1, that is, absence of the calculated brightness value is judged at a step S102, at a step S103 the flag n is set to "0". Subsequently, at a step S104 the accumulation time t is set to a predetermined value of t1 (first accumulation time) and an accumulating operation by the light-receiving device 7 is carried out. In this embodiment, t1 is set to 10 μs, so that the photometric range is set to EV10 through EV20. At a step S105, 240 photometric signals are read out through the transfer unit 72 and the current-to-voltage converter 73 in response to a predetermined charge read-out pulse which is generated in the timing circuit 8, converted to digital numerical values by the A/D converter 9 and then stored in a memory (not shown).

At a step S106, the accumulation time t of the second photometry in the case where there is no calculated brightness value is set to a predetermined value of t2 (second accumulation time) and the accumulating operation of the light-receiving device 7 is carried out again. In this embodiment, t2 is set to 10 ms, so that the photometric range is set to EV0 to EV10. At a step S107, the photometric signal is read out like the step S105, and the data thus read out is stored in a memory.

At a step S108, two photometric outputs are combined. That is, since the photometric range at the accumulation time t=t1 is from EV10 to EV20 and the photometric range at the accumulation time t=t2 is from EV0 to EV10, on the basis of the two photometric results, a photometric signal whose dynamic rage is from EV0 to EV20 is prepared. Specifically, 240 brightness data at t=t1 which are obtained at the step S105 are searched, and the photometric signal at t=t2 is used as a photometric result for a region whose photometric output is below the photometric lower-limit value, that is, below EV10, while the photometric output at t=t1 is used as a photometric result for a region whose photometric output is larger than the photometric lower-limit value. In this case, the accumulation time t2 is 1000 times of the accumulation time t1, and thus it is adopted to multiply data of t1 by 1000 or multiply data of t2 by 1/1000. Thereafter, the processing goes to a step S119.

On the other hand, if "n=1" is judged at the step S102, that is, if there is a brightness value which has been already calculated, the program goes to a step S109 to set a variable "k" to "1". The "k" represents the number of photometric operations at a step S110. "k=1" indicates a first photometry, and "k=0" indicates a second photometry. At the step S110, the accumulation time t is read out from a memory, and the above accumulation operation is carried out on the basis of the accumulation time t. The accumulation time t is calculated at a step S120 as described later on the basis of a previous photometric signal.

Upon judgment of "k=1" at a step S111, at a step S112 the photometric signal is read out and stored in the memory in the same manner as the step S105. Upon judgment of "k≠0", the program goes to a step S113. In the step S113, the photometric signal is read out in the same manner as the step S105 and the average value of the photometric signals of the first and second photometries is calculated for each segment of the light-receiving device 7. Then this average value is stored in the memory. Through this operation, 240 average values are obtained.

At a step S114, it is judged in the selection unit 14 whether the accumulation time t obtained at the step S120 is smaller than Tf1 (the first predetermined time). Tf1 represents a time for which affection of flicker is not negligible. Since the flicker's affection is not negligible when the accumulation time is shorter than the period of the flicker, Tf1 is set to 9.2 ms which is substantially an intermediate value between the flicker period of 10 ms in the 50 Hz region and the flicker period of 8.3 ms in the 60 Hz region. If the judgment at the step S114 is "NO", the second brightness value calculation mode is selected, and the program goes to a step S119. On the other hand, if the judgment at the step S114 is "YES", the program goes to a step S115.

At the step S115, it is judged in the selection unit 14 whether the accumulation time t is larger than Tf2 (second predetermined time). If the judgment at the step S115 is "NO", the second brightness value calculation mode is selected, and the program goes to the step S119. If the judgment at the step S115 is "YES", the first brightness value calculation mode is selected, and the program goes to a step S116. The reason for the judgment at the step S115 is as follows.

Under artificial illumination such as fluorescent lamp or the like, the brightness value is about EV14 at maximum, that is, illuminance on the light-receiving device is about 1561× at maximum. Therefore, when there is a brightness value which is larger than the above maximum value, the illumination may be considered as being based on natural light from the sun or the like. Accordingly, when the calculated accumulation time t is shorter than the accumulation time calculated by assuming that brightness of about 1561× on the light-receiving device is obtained in a previous photometry, there may be considered no affection of flicker. Therefore, Tf2 is set to the accumulation time 640 μs corresponding to 1561×.

At the step S116, it is judged whether k=1. If k≠1, the photometry has been already carried out twice after the judgment at the step S115 is "YES", and thus the program goes to the step S119. If k=1, the photometry has been carried out only once, and thus the program goes to the step S117 to carry out the photometry once again. At the step S117, K is set to "0", and subsequently at a step S118 a timer (not shown) is actuated. The program awaits its operation until a time of odd times of a half of the flicker period elapses from the accumulation start time, and returns to the step S110 when the time has elapsed to start the accumulation again. Through the two electric charge accumulations, a photometric signal having little affection of flicker can be obtained. Specifically, two photometric operations are carried out at times respectively which are deviated from each other by a half period of the flicker period Tf, and then the photometric signals as described above are added and averaged to obtain the photometric signal having little affection of flicker.

At the step S119, the brightness value calculation unit 10 is actuated to calculate a brightness value BV(m,n) for each photometric region on the basis of the 240 photometric signals (a photometric signal in one photometry or the average value of photometric signals in two photometric operations) obtained at the step S112 or S113 in accordance with a predetermined calculation equation. Here, (m,n) represents an address for specifying each segment of the light-receiving device as shown in FIG. 2, and m represents an integer between 1 to 20, which indicates a horizontal direction while n represents an integer between 1 to 20, which indicates a vertical direction.

At a step S119A, the exposure calculation unit 12 is actuated to calculate a proper exposure value BVans on the basis of each of the above calculated brightness values. The calculation method of BVans will be described later. At a step S120, the accumulation time setting unit 13 is started to calculate the accumulation time t for the next photometry and store it into a predetermined memory. This accumulation time calculation method will be described later.

If the release button (not shown) is judged to be fully pushed down at a step S121, the program goes to a step S122, and the diaphragm and the shutter are driven on the basis of the above calculated proper exposure value BVans to perform the exposure control. If the release button is not fully pushed down, the program returns to the step S102.

In the above control operation as shown in FIGS. 3A and 3B, the processings of the steps S112, S113 and S119 are carried out in the brightness calculation unit 13. The mode for calculating the average value of the photometric signals of the two photometric operations and then calculating the brightness value on the basis of the average value corresponds to the first exposure calculation mode, and the mode for calculating the photometric signal of one photometry corresponds to the second exposure calculation mode.

Figure 8:
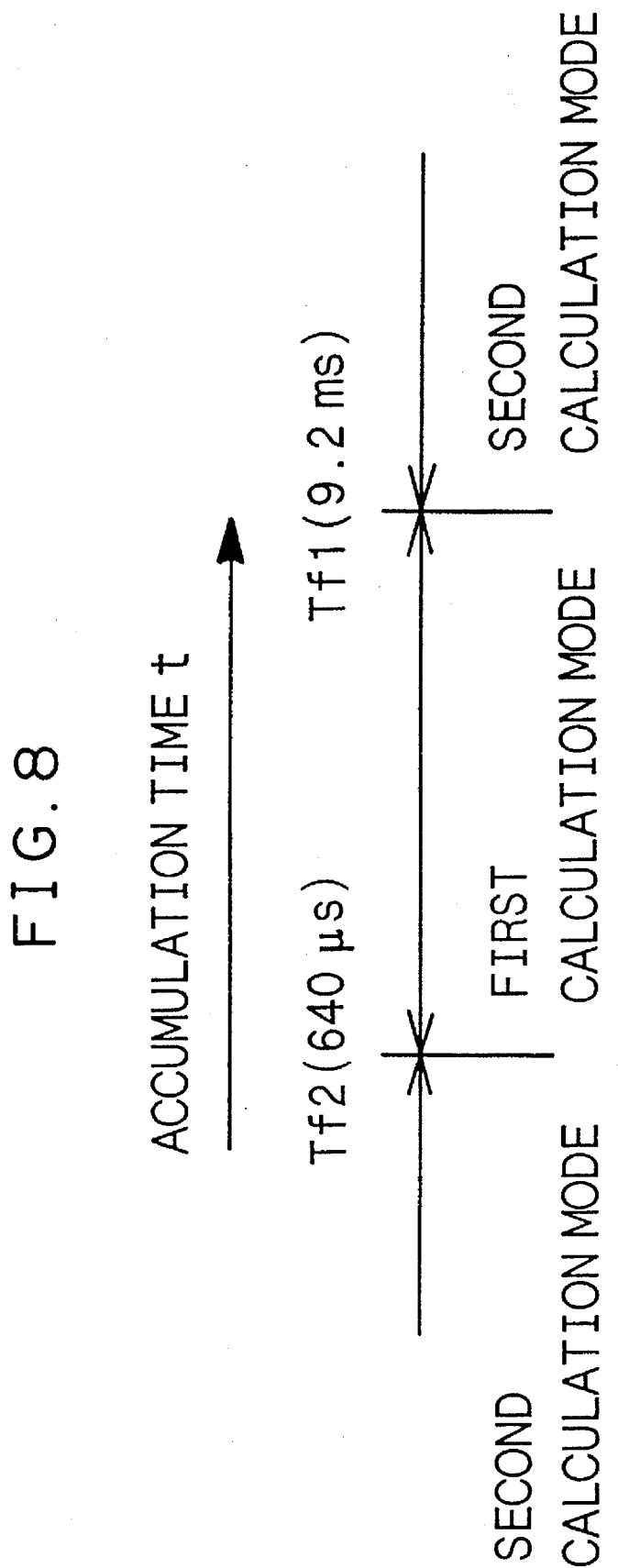
FIG. 8 is an explanatory diagram for an electric charge accumulation time imposing affection of flicker on a photometric result.

According to the procedure as described above, any one of the first brightness value calculation mode for suppressing the affection of flicker of a light source and the second brightness value calculation mode for taking no consideration of the affection of flicker is selected on the basis of the accumulation time. More specifically, as shown in FIG. 8, if the following condition is satisfied:

second predetermined time Tf2<accumulation time t< first predetermined time Tf1 the first calculation mode is selected. If the above condition is not satisfied, the second calculation mode is selected. Accordingly, in cases other than the case where the flicker greatly affects the photometric result, an unnecessary calculation to remove the affection of flicker is not carried out.

<Exposure Calculation>

Figure 4:
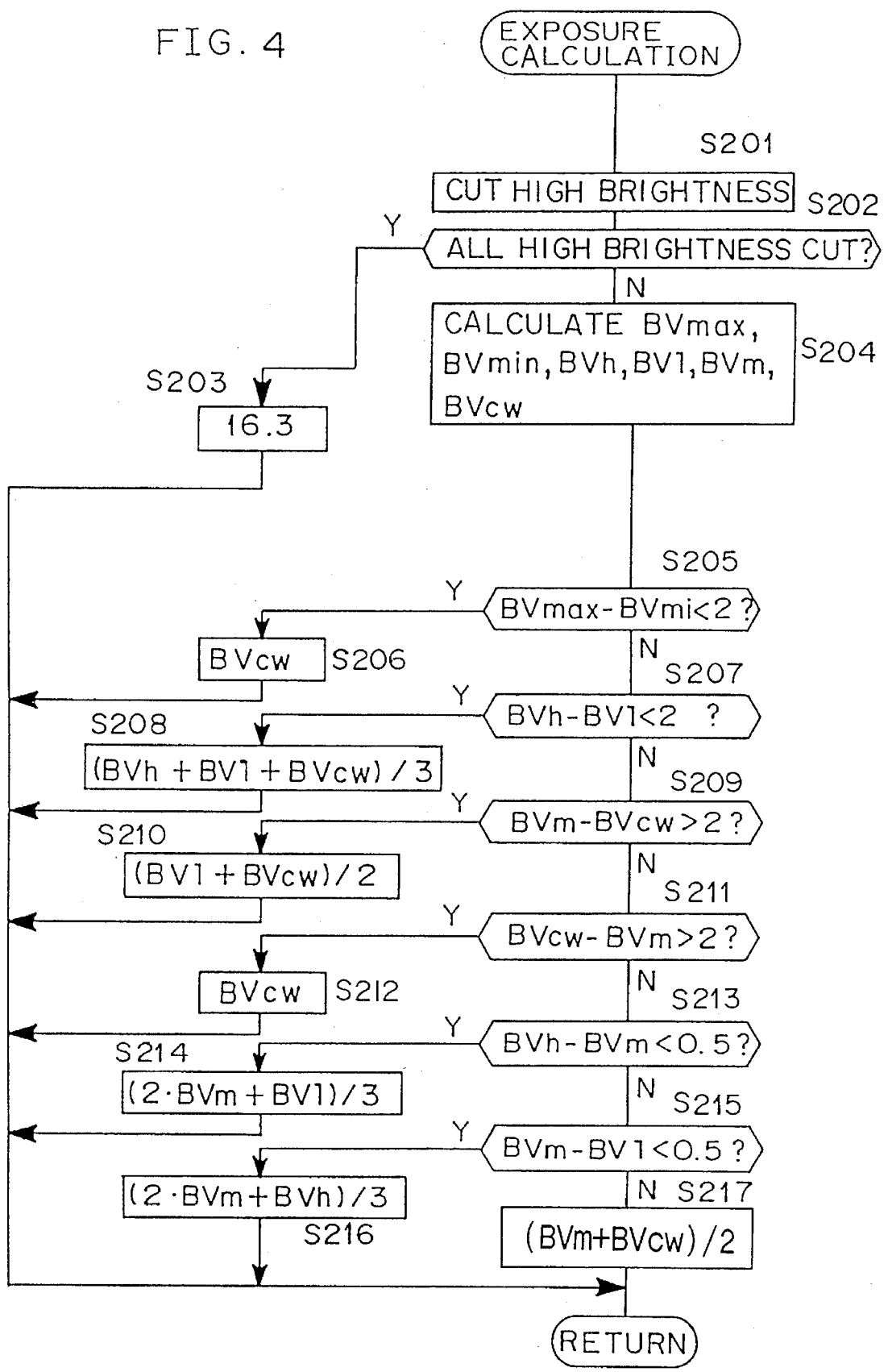
FIG. 4 is a flowchart for an exposure calculating subroutine.

An example of the exposure calculation processing at the step S119A will be described with reference to a flowchart of FIG. 4.

At a step S201, those data which have brightness values exceeding 16.3E V among the 240 brightness values BV(m, n) obtained in correspondence with each photometric region are replaced by 16.3 EV. When a subject having ultrahigh brightness value exceeding 16.3 EV such as the sun exists in a photographic field, the ultrahigh brightness value affects the calculation of the exposure value strongly, and thus the above operation is a countermeasure for suppressing the strong affection of the ultrahigh brightness value at maximum.

At a step S202 it is judged whether all of 240 photometric data are replaced with 16.3 EV or not. If the judgment at the step S202 is "YES", BVans is set to 16.3. If the judgment at the step S202 is "NO", at a step S204 BVmax, BVmin, BVh, BVl, BVm and BVcw are calculated from each brightness value BV(m,n). The contents of these variables are as follows.

BVmax: the maximum brightness value of 240 brightness values

BVmin: the minimum brightness value of 240 brightness values

BVh: the average brightness value of 24 brightness values which are picked up according to degree from high to low in 240 brightness values BVl: the average brightness value of 24 brightness values which are picked up according to degree from low to high in 240 brightness values BVm: the average value of all of 240 brightness values BVcw: the average brightness value of brightness values corresponding to 36 regions (as indicated by "A" in FIG. 2) of 8<m<13 and 4<n<9, of 240 brightness values BV(m,n)

In this embodiment, the average value of 24 brightness values is calculated to obtain BVh and BVl, however, the number of the brightness values used in averaging is not limited to 24. For example, it may be more or less than 24. Likewise, the number of the brightness values for BVcw used in averaging is not limited to 36, and it may be determined on the basis of brightness values which are located in the neighborhood of the center of the subject field.

At a step S205, it is judged whether BVmax-BVmin<2. If the judgment at the step S205 is "YES", since the difference between the maximum brightness value and the minimum brightness value is small, an object to be photographed can be regarded as having extremely flat brightness and an exposure value is similar even a calculation thereof is made using the brightness values of any region. Therefore, at a step S206 the average brightness value BVcw of 36 brightness values corresponding to regions at the central portion which are highly reliable is substituted for the proper exposure value BVans. That is, BVans is set to BVcw.

If the judgment at the step S205 is "NO", the program goes to a step S207 to judge whether BVh-BVl<2. If the judgment at the step S207 is "YES", the difference between the brightness values of the high-brightness region and the brightness values of the low-brightness region is small and an object to be photographed can be regarded as having a substantially flat brightness, so that the proper exposure value BVans is calculated as follows at a step S208.

$$BVans=(BVh+BVl+BVcw)/3$$

If the judgment at the step S207 is "NO", the program goes to a step S209 to judge whether BVm−BVcw>2. If the judgment at the step S209 is "YES", it can be considered that the brightness value of the central portion is lower than the average brightness value, that is, the central portion is dark and the backlight situation occurs, and the proper exposure value Vans is calculated as follows at a step S210.

$$BVans=(BVl+BVcw)/2$$

If the judgment at the step S209 is "NO", the program goes to a step S211 to judge whether BVcw−BVm>2. If the judgment at the step S211 is "YES", it can be considered that the brightness value at the central portion is larger than the average brightness value, that is, the central portion is bright and an object is under a spot light. Therefore, at a step S212, the proper exposure value BVans is set to the average brightness value BVcw.

If the judgment at the step S211 is "NO", the program goes to a step S213 to judge whether Bvh−BVm<0.5. If the judgment at the step S213 is "YES", the difference between the brightness value corresponding to the high-brightness region and the average brightness value is small and an object to be photographed can be regarded as including a small dark subject in a photographic field. Accordingly, the proper exposure value BVans is calculated as follows at a step S214.

$$BVans=(2 \cdot BVm+BVl)/3$$

If the judgment at the step S213 is "NO", the program goes to a step S215 to judge whether BVm−BVl<0.5. If the judgment at the step S215 is "YES", the difference between the brightness value corresponding to the low-brightness region and the average brightness value is small and thus an object to be photographed can be regarded as including a small bright subject in a photographic field. Accordingly, the proper exposure value BVans is calculated as follows at a step S216.

$$BVans=(2 \cdot BVm+BVh)/3$$

If the judgment at the step S215 is "NO", an object to be photographed is not matched with any scene as described above, and thus it is regarded as a general scene. Accordingly, the proper exposure value BVans is calculated as follows at a step S217.

$$BVans=(BVm+BVcw)/2$$

<Calculation Method of Optimum Accumulation Time>

Figure 5:
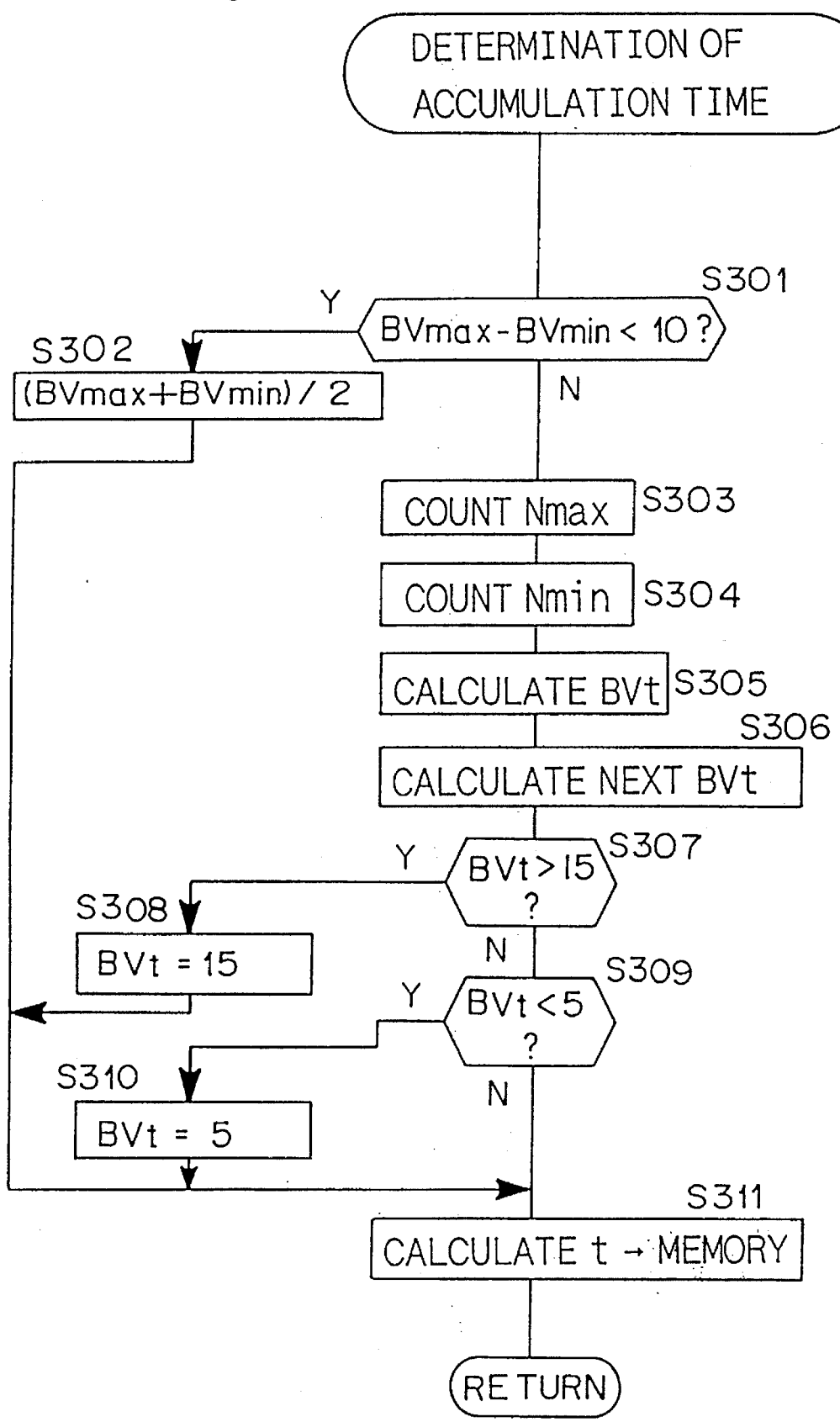
FIG. 5 is a flowchart for an electric charge accumulation-time calculating subroutine.
Figure 6:
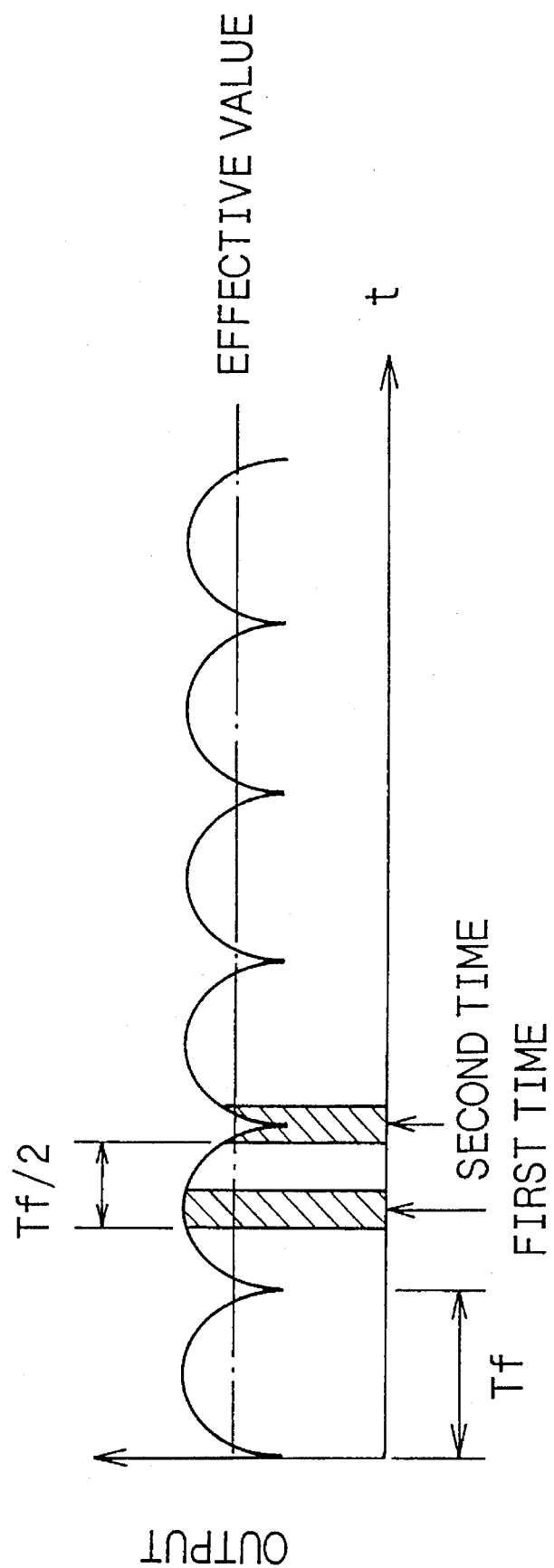
FIG. 6 is a fundamental diagram for a method of reducing affection of flicker.
Figure 7:
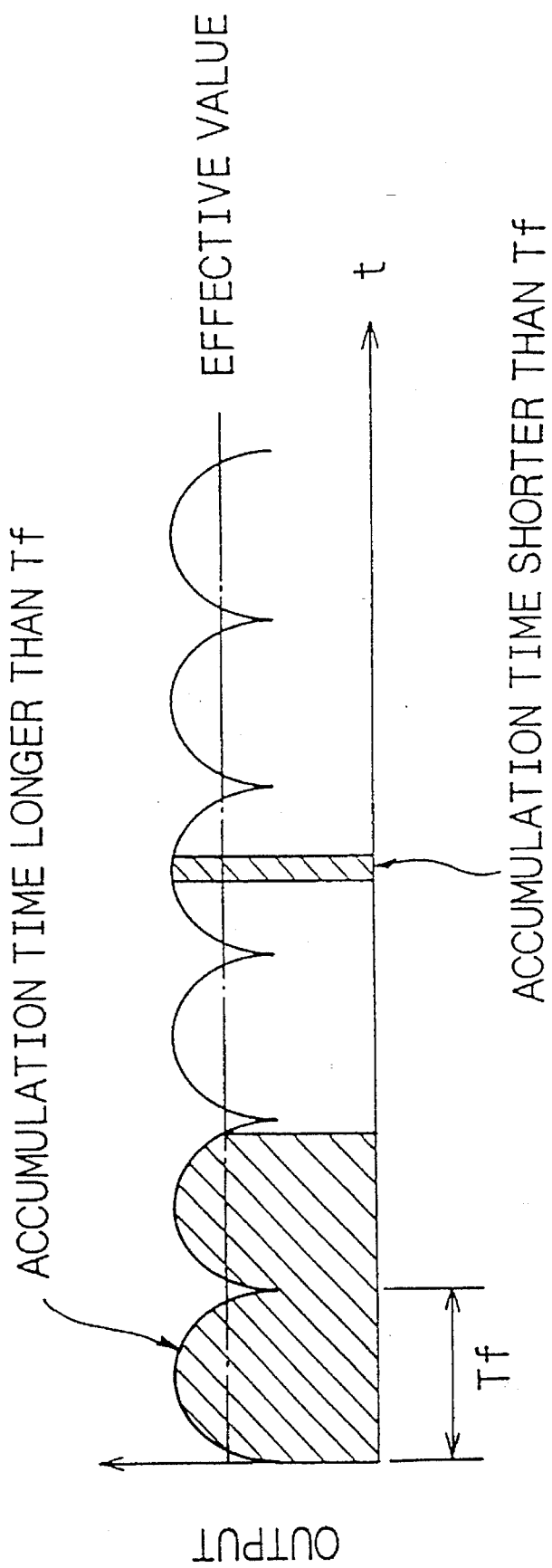
FIG. 7 is an explanatory diagram for affection of flicker on a photometric result.

FIG. 5 shows a flowchart for the details of the accumulation-time calculation at the step S120 of FIGS. 3A and 3B.

It is first judged at step S301 whether BVmax−BVmin< 10. If the judgment at the step S301 is "YES", all of 240 photometric outputs are regarded as being within the desirable dynamic range, and a next photometric reference level BVt is calculated through the average of the maximum and minimum brightness values at a step S302.

$$BVt=(BVmax+BVmin)/2$$

Here, the photometric reference level BVt represents the brightness value providing just a half of the saturation level of the photometric output when the photometry is carried out with a certain accumulation time, and for example it is equal to "15" when the photometric range is from EV10 to EV20.

Substituting BVt into the equation used at a step S311 as described later, an accumulation time for providing such a photometric range that BVt is equal to a half of the saturation level is calculated.

If the judgment at the step S301 is "NO" this means that in the previous photometric operation data existed which was equal to the photometric upper-limit value (the brightness value corresponding to the maximum value usable in the A/D converter 13) or below the photometric lower limit (the brightness value corresponding to the noise level of the A/D converter 13, ordinarily "1" or "2"), and thus the number Nmax of data having the above photometric upper-limit value in the previous photometric operation is counted at a step S303. Like the step S303, the number Nmin of data having a value below the photometric lower-limit value in the previous photometric operation is counted at a step S304. At a step S305, the photometric reference level BVt in the previous photometric operation is calculated in accordance with the following equation.

$$BVt=log(0.32/t)/log(2)$$

Here, t represents the accumulation time in the previous photometry. For example, BVt=5 for t=0.01 sec.

Subsequently, at step S306, the photometric reference level BVt for the next photometry is calculated using the previous photometric reference level as follows.

$$BVt=BVt+(Nmax-Nmin)/10$$

According to this equation, the next photometric reference level increases because the fact that Nmax is larger than Nmin means that the number of the data having the above upper-limit value is large, and inversely the next photometric reference level decreases because the fact that Nmin is larger than Nmax means that the number of the data having the value below the lower-limit value is large. The increase of the photometric reference level corresponds to a shift of the photometric range to the high-brightness side, while the decrease of the photometric reference level corresponds to a shift of the photometric range to the low-brightness side. The value (Nmax−Nmin) is reduced to its one-tenth to optimize shift degree of the level. However, in place of the value of "1/10", any proper value may be used.

At a step S307 it is judged whether BVt>15. If the judgment at the step S307 is "YES", the photometric reference level exceeds the photometric upper limit value, and thus the next photometric reference level BVt is set to the photometric upper limit value of "15" at a step S308. At this time, the photometry can be made within EV10 to EV20. If the judgment at the step S307 is "NO", the program goes to a step S309 to judge whether BVt<5. If the judgment at the step S309 is "YES", the photometric reference level falls below the photometric lower limit value, and thus the next photometric reference level BVt is set to the photometric lower limit value of "5" at a step S310. At this time, the photometry can be made within EV0 to EV10. On the other hand, if the judgment at the step S309 is "NO", the program goes to a step S311.

At the step S311, the next accumulation time t is calculated from BVt which is obtained at any one of the steps S302, S306, S308 and S310 in accordance with the following equation, and the thus-obtained t is stored at a predetermined address in a memory:

$$t=0.32/2^{BVt}$$

This accumulation time t is an accumulation time with which a photometric range providing the value of BVt of a half of the saturation level is obtained, and the accumulation time t is shorter as the value of BVt is larger.

According to the procedure of FIG. 5, when a dynamic range represented by the difference between the maximum value and the minimum value of the brightness value for respective photometric outputs is lower than a dynamic range "10" of the photoelectric conversion device, that is, when all photometric signals are available as a signal within a photometric dynamic range of one photometry, the accumulation time t is calculated so that the average value of the maximum value and the minimum value of the brightness values is equal to an intermediate value in the photometric range of the next photometry. If the photometry is carried out with the accumulation time t thus calculated, there is little possibility that an obtained photometric signal is over the upper-limit value and the lower-limit value of the above photometric range, and there is high possibility that the optimum exposure value can be calculated in only one photometric operation, so that a next photographing operation can be rapidly carried out.

Further, in the case where a dynamic range represented by the difference between the maximum value and the minimum value of the brightness value is above the dynamic range "10" of the photoelectric conversion device, that is, in the case where a brightness value above the upper-limit value or a brightness value below the lower-limit value necessarily exists in the previous photometric operation, the accumulation time t is calculated in accordance with the numbers of Nmax and Nmin as described above. In details, the accumulation time t is calculated such that the accumulation time of the next photometry is shorter than the accumulation time of the previous accumulation time, that is, the photometric range is shifted to the high-brightness side, when the number of Nmax is larger than the number of Nmin, and such that the accumulation time of the next photometry is longer than the accumulation time of the previous photometry, that is, the photometric range is shifted to the low-brightness side, when the number of Nmax is smaller than the number of Nmin. Accordingly, if the photometry is carried out with this accumulation time t, there is little possibility that the photometric signal obtained in the above manner is over the upper-limit value and the lower-limit value, and thus there is high possibility that the optimum exposure value can be calculated in only one photometric operation.

The sectioning manner of the light-receiving device of this invention is not limited to that of the above embodiment. Further, the countermeasure for suppressing the affection of flicker is not limited to that of the above embodiment, and for example, a method as disclosed in Japanese Laid-open Patent Application No. 62-259022 may be used.

Further, the brightness value may be calculated in the first calculation mode at all times in cases other than the case where a predetermined brightness based on sun light or the like is identified, or in the case where the accumulation time is shorter than the flicker period.

I claim:

1. A photometric control device for a camera, comprising:

photometric means including a plurality of charge-accumulation type of photoelectric devices, for performing a photometry on a subject field divided into plural sections to output a photometric signal corresponding to brightness of the subject field;

accumulation time control means for controlling an accumulation time of said photoelectric device;

selection means for selecting any one of a first brightness value calculation mode for suppressing affection of flicker and a second brightness value calculation mode for taking no consideration of affection of flicker on the basis of the accumulation time determined by said accumulation time control means; and brightness value calculation means for calculating a brightness value in accordance with the selected brightness value calculation mode on the basis of the photometric signal from said photometric means.

2. The photometric control device as claimed in claim 1, wherein said photoelectric devices are arranged in a matrix form within the subject field.

3. The photometric control device as claimed in claim 1, wherein said brightness value calculation means calculates the brightness value on the basis of photometric signals obtained in plural photometries.

4. The photometric control device as claimed in claim 1, wherein said brightness value calculation means includes;

first read-out means, when the first brightness value calculation mode is selected, for activating said photometric means for a set accumulation time from a first time and reading out a photometric signal output from said photometric means, second read-out means for activating said photometric means for a set accumulation time from a second time at which a delay time set to prevent affection of a flicker elapses from the first time and reading out a photometric signal output from said photometric means, wherein, said brightness value calculation means calculates the brightness value on the basis of the photometric signals read out by said first and second read-out means.

5. The photometric control device as claimed in claim 4, wherein said photoelectric devices are arranged in a matrix form within the subject field.

6. The photometric control device as claimed in claim 4, wherein said brightness value calculation means calculates the brightness value on the basis of an average value of the photometric signals read out by said first and second read-out means.

7. The photometric control device as claimed in claim 1, wherein said selection means includes first judgment means for judging whether the accumulation time is shorter than a first predetermined time, and selects the first brightness value calculation mode when the accumulation time is judged to be shorter than the first predetermined time, and the second brightness value calculation mode when the accumulation time is judged to be above the first predetermined time.

8. The photometric control device as claimed in claim 1, wherein said selection means includes second judgment means for judging whether the accumulation time is longer than a second predetermined time, and selects the first brightness value calculation mode when the accumulation time is longer than the second predetermined time, and the second calculation mode when the accumulation time is shorter than the second predetermined time.

9. The photometric control device as claimed in claim 1, wherein said selection means includes judgment means for judging whether the accumulation time is shorter than a first predetermined time and longer than the second predetermined time (<first predetermined time), time and selects the first brightness value calculation mode when the accumulation time is judged to be shorter than the first predetermined time and longer than the second predetermined time by said judgment means, and the second brightness value calculation mode when the accumulation time is judged to be above the first predetermined time or below the second predetermined time by said judgment means.

10. The photometric control device as claimed in claim 1, wherein said accumulation time control means includes:

means for judging whether the brightness value has been already calculated by said brightness value calculation means;

means for setting a predetermined accumulation time when the brightness value is judged not to have been calculated by said judgment means; and means for calculating and setting an accumulation time on the basis of the brightness value calculated by said brightness value calculation means when the brightness value is judged to have been calculated by said judgment means.

11. The photometric control device as claimed in claim 1, wherein said accumulation time control means includes:

means for judging whether the brightness value has been already calculated by said brightness value calculation means; and means for setting predetermined first and second accumulation times when the brightness value is judged not to have been calculated by said brightness value calculation means, and wherein, said brightness value calculation means includes means for calculating the brightness value in accordance with the second calculation mode on the basis of the photometric signals obtained when said photometric means is actuated respectively for both of a first time and second accumulation times.

12. A photometric control device for a camera including:

a group of charge accumulation type of photoelectric-conversion segments which are arranged in a matrix form within a subject field to output respective photometric signals corresponding to brightness of the subject field;

accumulation time control means for controlling an accumulation time of said charge accumulation type of photoelectric-conversion segment group;

judgment means for judging whether the accumulation time is shorter than a first predetermined time and longer than a second predetermined time (<first predetermined time);

selection means for selecting a first brightness value calculation mode when the accumulation time is judged to be shorter than the first predetermined time and longer than the second predetermined time by said judgment means, and a second brightness value calculation mode when the accumulation time is judged to be above the first predetermined time or below the second predetermined time by said judgment means; and brightness value calculation means for calculating the brightness value in accordance with the selected brightness value calculation mode on the basis of said photometric signals from said photoelectric-conversion segment group.

13. The photometric control device as claimed in claim 12, wherein said brightness value calculation means includes;

first read-out means, when the first brightness value calculation mode is selected, for activating said photoelectric-conversion segment group for a set accumulation time from a first time and reading out a photometric signal output from said photoelectric-conversion segment group, second read-out means for activating said photoelectric-conversion segment group for a set accumulation time from a second time at which a delay time set to prevent affection of a flicker elapses from the first time and reading out a photometric signal output from said photoelectric-conversion segment group, wherein, said brightness value calculation means calculate the brightness value on the basis of the photometric signals read out by said first and second read-out means.

14. The photometric control device as claimed in claim 13, wherein said brightness value calculation means calculates the brightness value on the basis of an average value of the photometric signals read out by said first and second read-out means.

15. A photometric control device for a camera, comprising:

a charge accumulation type photoelectric conversion device including a plurality of charge accumulation elements that perform photometry on a subject field divided into plural sections and output plural photometric signals corresponding to a brightness of the plural sections of the subject field;

a photometry controller that controls an accumulation time of said photoelectric conversion device;

said photometry controller selecting any one of a first brightness value calculation mode that suppresses affection of flicker and a second brightness value calculation mode that takes no consideration bf flicker, on the basis of the accumulation time;

said photometry controller calculating brightness values for the plural sections of the subject field in accordance with the selected brightness value calculation mode and the photometric signals output from said photoelectric conversion device.

16. The photometric control device of claim 15, wherein said plurality of charge accumulation elements are arranged in a matrix form.

17. The photometric control device of claim 15, wherein said photometry controller calculates the brightness values on the basis of photometric signals obtained in plural photometry operations.

18. The photometric control device of claim 15, wherein said photometry controller:

activates said photoelectric conversion device for a set accumulation time from a first time and reads out a first set of photometric signals, activates said photoelectric conversion device for a set accumulation time from a second time at which a delay time set to prevent affection of flicker elapses from the first time and reads out a second set of photometric signals, and calculates the brightness values on the basis of the first and second sets of photometric signals when the first brightness value calculation mode is selected.

19. The photometric control device of claim 18, wherein said plurality of charge accumulation elements are arranged in a matrix.

20. The photometric control device of claim 18, wherein said photometry controller calculates the brightness values on the basis of average values of the first and second sets of photometric signals.

21. The photometric control device of claim 15, wherein said photometry controller judges whether the accumulation time is shorter than a first predetermined time, and selects the first brightness value calculation mode when the accumulation time is judged to be shorter than the first predetermined time, and selects the second brightness value calculation mode when the accumulation time is judged to be longer than the first predetermined time.

22. The photometric control device of claim 15, wherein said photometry controller judges whether the accumulation time is longer than a second predetermined time, and selects the first brightness value calculation mode when the accumulation time is longer than the second predetermined time, and selects the second brightness value calculation mode when the accumulation time is shorter than the second predetermined time.

23. The photometric control device of claim 15, wherein said photometry controller judges whether the accumulation time is shorter than a first predetermined time and is longer than a second predetermined time, and selects the first brightness value calculation mode when the accumulation time is judged to be shorter than the first predetermined time and longer than the second predetermined time, and selects the second brightness value calculation mode when the accumulation time is judged to be longer than the first predetermined time or shorter than the second predetermined time.

24. The photometric control device of claim 15, wherein said photometry controller judges whether the brightness values already have been calculated and sets a predetermined accumulation time when the brightness values have not already been calculated; and said photometry controller calculates and sets an accumulation time on the basis of the brightness values when the brightness values already have been calculated.

25. The photometric control device of claim 15, wherein said photometry controller judges whether the brightness values already have been calculated and sets predetermined first and second accumulation times when the brightness values have not been calculated, and wherein said photometry controller calculates the brightness values in accordance with the second calculation mode on the basis of the photometric signals obtained when said photoelectric conversion device is actuated respectively for both of said predetermined first and second accumulation times.

26. A photometric control device for a camera including:

a photoelectric conversion device including plural charge accumulation type photoelectric conversion elements arranged in a matrix, said photoelectric conversion device outputting photometric signals corresponding to a brightness of plural sections of a subject field;

a photometry controller for controlling an accumulation time of said photoelectric conversion device;

said photometry controller judging whether the accumulation time is shorter than a first predetermined time and longer than a second predetermined time;

said photometry controller selecting a first brightness value calculation mode when the accumulation time is shorter than said first predetermined time and longer than said second predetermined time, and selecting a second brightness value calculation mode when the accumulation time is longer than said first predetermined time or shorter than said second predetermined time; and wherein said photometry controller calculates brightness values in accordance with the selected brightness value calculation mode and the photometric signals output by said photoelectric conversion device.

27. The photometric control device of claim 26, wherein said photometry controller activates said photoelectric conversion device for a first accumulation time from a first time and reads out a first set of photometric signals from said photoelectric conversion device and activates said photoelectric conversion device for a second accumulation time from a second time at which a delay time set to prevent affection of a flicker elapses from said first time and reads out a second set of photometric signals from said photoelectric conversion device, and said photometry controller calculates the brightness values on the basis of the first and second sets of photometric signals.

28. The photometric control device of claim 27, wherein said photometry controller calculates the brightness values on the basis of averages of the first and second sets of photometric signals.

29. A method of controlling a charge accumulation type photoelectric conversion device of a camera, said photoelectric conversion device including a plurality of charge accumulation elements that perform photometry on a subject field divided into plural sections and output plural photometric signals corresponding to a brightness of the plural sections of the subject field, said method comprising:

selecting an accumulation time of said photoelectric conversion device;

based on the selected accumulation time, selecting one of a first brightness value calculation mode that suppresses affection of flicker and a second brightness value calculation mode that takes no consideration of flicker; and calculating brightness values for the plural sections of the subject field in accordance with the selected brightness value calculation mode and the photometric signals output from said photoelectric conversion device.

30. The method of claim 29, wherein said plurality of charge accumulation elements are arranged in a matrix form.

31. The method of claim 29, wherein said brightness values are calculated on the basis of photometric signals obtained in plural photometry operations.

32. The method of claim 29, wherein, when the first brightness value calculation mode is selected, said brightness values are calculated by:

activating said photoelectric conversion device for the selected accumulation time from a first time and reading out a first set of photometric signals;

activating said photoelectric conversion device for the selected accumulation time from a second time, at which a delay time set to prevent affection of flicker elapses from the first time, and reading out a second set of photometric signals; and calculating the brightness values on the basis of the first and second sets of photometric signals.

33. The method of claim 32, wherein said plurality of charge accumulation elements are arranged in a matrix.

34. The method of claim 32, wherein said brightness values are calculated based on average values of the first and second sets of photometric signals.

35. The method of claim 29, wherein said brightness value calculation mode is selected by:

judging whether the selected accumulation time is shorter than a first predetermined time, and selecting the first brightness value calculation mode when the selected accumulation time is judged to be shorter than the first predetermined time, and selecting the second brightness value calculation mode when the selected accumulation time is judged to be longer than the first predetermined time.

36. The method of claim 29, wherein said brightness value calculation mode is selected by:

judging whether the selected accumulation time is longer than a second predetermined time, and selecting the first brightness value calculation mode when the selected accumulation time is longer than the second predetermined time, and selecting the second brightness value calculation mode when the selected accumulation time is shorter than the second predetermined time.

37. The method of claim 29, wherein said brightness value calculation mode is selected by:

judging whether the selected accumulation time is shorter than a first predetermined time and is longer than a second predetermined time, and selecting the first brightness value calculation mode when the selected accumulation time is judged to be shorter than the first predetermined time and longer than the second predetermined time, and selecting the second brightness value calculation mode when the selected accumulation time is judged to be longer than the first predetermined time or shorter than the second predetermined time.

38. The method of claim 29, wherein said accumulation time is selected by:

judging whether the brightness values already have been calculated;

selecting a predetermined accumulation time when it is judged that the brightness values have not been calculated; and selecting the accumulation time on the basis of the brightness values when it is judged that the brightness values already have been calculated.

39. The method of claim 29, wherein said accumulation time is selected by:

judging whether the brightness values already have been calculated;

selecting predetermined first and second accumulation times when it is judged that the brightness values have not been calculated; and said brightness values are calculated in accordance with the second calculation mode on the basis of the photometric signals obtained when said photoelectric conversion device is actuated respectively for both of said predetermined first and second accumulation times.

40. A method of controlling a photoelectric conversion device of a camera, said photoelectric conversion device including plural charge accumulation type photoelectric-conversion elements arranged in a matrix, said photoelectric conversion device outputting photometric signals corresponding to a brightness of plural sections of a subject field, said method comprising:

selecting an accumulation time of said photoelectric conversion device;

judging whether the selected accumulation time is shorter than a first predetermined time and longer than a second predetermined time;

selecting a first brightness value calculation mode when the selected accumulation time is shorter than said first predetermined time and longer than said second predetermined time, and selecting a second brightness value calculation mode when the selected accumulation time is longer than said first predetermined time or shorter than said second predetermined time; and calculating brightness values in accordance with the selected brightness value calculation mode and the photometric signals output by said photoelectric conversion device.

41. The method of claim 40, wherein said selected accumulation time includes a first accumulation time and a second accumulation time, and said brightness values are calculated by:

activating said photoelectric conversion device for the first accumulation time from a first time and reading out a first set of photometric signals from said photoelectric conversion device;

activating said photoelectric conversion device for the second accumulation time from a second time at which a delay time set to prevent affection of a flicker elapses from said first time and reading out a second set of photometric signals from said photoelectric conversion device; and calculating the brightness values on the basis of the selected brightness value calculation mode and the first and second sets of photometric signals.

42. The method of claim 41, wherein said brightness values are calculated on the basis of averages of the first and second sets of photometric signals.

43. A method of calculating an exposure value for a subject field using a charge accumulation type photoelectric device having plural charge accumulation elements arranged in a matrix, comprising the steps of:

operating the photoelectric device for a first accumulation time to determine brightness values for plural regions of the subject field during the first accumulation time;

determining if the first accumulation time is shorter than a first predetermined time, determining if the first accumulation time is longer than a second predetermined time, operating the photoelectric device for a second accumulation time to determine brightness values for plural regions of the subject field during the second accumulation time when the first accumulation time is shorter than the first predetermined time and longer than the second predetermined time, wherein the second accumulation time begins after a predetermined delay period has elapsed after the beginning of the first accumulation time;

calculating an exposure value based on the brightness values of the first accumulation when the first accumulation time is longer than the first predetermined time or shorter than the second predetermined time; and calculating an exposure value based on an average of the brightness values of the first and second accumulations when the first accumulation time is shorter than the first predetermined time and longer than the second predetermined time.

44. A method of calculating an exposure value for a subject field using a charge accumulation type photoelectric device having plural charge accumulation elements arranged in a matrix, comprising the steps of:

operating the photoelectric device for a first accumulation time to determine brightness values for plural regions of the subject field during the first accumulation time;

determining if the first accumulation time is shorter than a first predetermined time, operating the photoelectric device for a second accumulation time to determine brightness values for plural regions of the subject field during the second accumulation time when the first accumulation time is shorter than the first predetermined time, wherein the second accumulation time begins after a predetermined delay period has elapsed after the beginning of the first accumulation time;

calculating an exposure value based on the brightness values of the first accumulation when the first accumulation time is longer than the first predetermined time; and calculating an exposure value based on an average of the brightness values of the first and second accumulations when the first accumulation time is shorter than the first predetermined time.

45. The method of calculating an exposure value of claim 44, further comprising the steps of:

calculating a new first accumulation time based on the brightness values of the first accumulation.

46. The method of calculating an exposure value according to claim 45, wherein calculation of the new first accumulation time is based on a number of maximum brightness values and a number of minimum brightness values.

47. The method of calculating an exposure value according to claim 45, wherein calculation of the new first accumulation time is based on an average of maximum and minimum brightness values.

48. The method of calculating an exposure value of claim 44, further comprising the step of:

calculating a new first accumulation time based on the brightness values of the first and second accumulations.

49. The method of calculating an exposure value according to claim 48, wherein calculation of the new first accumulation time is based on a number of maximum brightness values and a number of minimum brightness values.

50. The method of calculating an exposure value according to claim 48, wherein calculation of the new first accumulation time is based on an average of maximum and minimum brightness values.

51. The method of calculating an exposure value of claim 44 wherein the exposure value is based on brightness values from selected regions of the subject field.

52. The method of calculating an exposure value of claim 44, further comprising the steps of:

calculating an average brightness value for a region of the subject field;

calculating an overall average brightness value for the entire subject field;

calculating an average high brightness value;

calculating an average low brightness value;

comparing the average brightness value of the region of the subject field to the overall average brightness value, the average high brightness value, and the average low brightness value; and selecting a method of calculating the exposure value based on the brightness value comparisons.

53. The method of calculating an exposure value of claim 52, further comprising the steps of:

determining a maximum brightness value;

determining a minimum brightness value;

comparing the maximum brightness value to the minimum brightness value; and comparing the average high brightness value to the average low brightness value.

54. The method of calculating an exposure value according to claim 44, wherein the exposure value is set to a predetermined exposure value when the brightness values of all the regions of the subject field exceed a predetermined high brightness value.

55. The method of calculating an exposure value for a subject field according to claim 44, wherein brightness values are generally in the range of 0 EV to 20 EV on a logarithmic scale, and wherein the step of determining the exposure value further comprises the steps of:

calculating a maximum brightness value;

calculating a minimum brightness value;

calculating an average high brightness value based on a predetermined number of the highest brightness values;

calculating an average low brightness value based on a predetermined number of the lowest brightness values;

calculating a median brightness value based on all the brightness values calculating an average central brightness value based on a predetermined number of brightness values from the center of the subject field;

calculating the exposure value based on the average central brightness value when the difference between the maximum brightness value and the minimum brightness value is less than 2 EV;

calculating the exposure value based on an average of the average high brightness value, the average low brightness value and the average central brightness value when the difference between the average high brightness value and the average low brightness value is less than 2 EV;

calculating the exposure value based on an average of the average low brightness value and the average central brightness value when the difference between the median brightness value and the average central brightness value is greater than 2 EV;

calculating the exposure value based on the average central brightness value when the difference between the average central brightness value and the median brightness value is less than 2 EV;

calculating the exposure value based on the average of two times the median brightness value and the average low brightness value when the difference between the average high brightness value and the median brightness value is less than 0.5 EV;

calculating the exposure value based on the average of two times the median brightness value and the average high brightness value when the difference between the median brightness value and the average low brightness value is less than 0.5 EV;

calculating the exposure value for all other cases based on an average of the median brightness value and the average central brightness value.

56. The method of calculating an exposure value according to claim 44, further comprising the steps of first:

determining if brightness values have already been calculated and if brightness values have not already been calculated, then:

operating the photoelectric device for a first standard accumulation time to determine brightness values for plural regions of the subject field during the first standard accumulation time;

operating the photoelectric device for a second standard accumulation time to determine brightness values for plural regions of the subject field during the second standard accumulation time;

creating a composite set of brightness values based on the brightness values from the first and second accumulations;

calculating an exposure value based on the composite set of brightness values; and calculating a new first accumulation time based on the composite set of brightness values.

* * * * *